United States Patent [19]
Rodart

[11] Patent Number: 5,113,806
[45] Date of Patent: May 19, 1992

[54] BICATALYTIC IGNITER CONVERTER AND PROCESSOR FOR INTERNAL COMBUSTION ENGINES

[76] Inventor: George H. Rodart, 836 S. Los Robles, Pasadena, Calif. 91106

[21] Appl. No.: 664,387

[22] Filed: Mar. 4, 1991

[51] Int. Cl.$^5$ .............................. F02B 47/02
[52] U.S. Cl. .................... 123/25 P; 123/25 D; 123/143 B; 123/169 EL; 123/670; 313/120; 313/141
[58] Field of Search ............. 123/25 P, 25 B, 25 D, 123/169 EL, 143 B, 670, 169 R, 169 PA, 272; 313/120, 141

[56] References Cited

U.S. PATENT DOCUMENTS

| | | | |
|---|---|---|---|
| 1,467,137 | 9/1923 | Curran | 123/25 B |
| 1,724,526 | 8/1929 | Sokal | 123/668 |
| 2,656,830 | 10/1953 | Houdry | 123/670 |
| 2,744,211 | 5/1956 | Berkman | 123/169 PA |
| 3,648,676 | 3/1972 | Lowman, Jr. | 123/670 |
| 3,760,778 | 9/1973 | May | 123/25 D |
| 3,911,307 | 10/1975 | Goto et al. | 313/143 |
| 4,014,299 | 3/1977 | Kubota | 123/25 P |
| 4,061,122 | 12/1977 | Edgar et al. | 123/169 EL |
| 4,345,555 | 8/1982 | Oshima et al. | 123/272 |
| 4,402,182 | 9/1983 | Miller | 123/25 P |
| 4,476,819 | 10/1984 | Szloboda | 123/25 C |
| 4,530,340 | 7/1985 | Totman | 123/670 |
| 4,540,910 | 9/1985 | Kondo et al. | 313/11.5 |
| 4,700,103 | 10/1987 | Yamaguchi et al. | 313/141 |

FOREIGN PATENT DOCUMENTS

| | | | |
|---|---|---|---|
| 2498384 | 7/1982 | France | 123/169 R |
| 54-1585 | 12/1979 | Japan . | |
| 56-2703 | 3/1981 | Japan . | |
| 260629 | 2/1927 | United Kingdom | 313/120 |
| 455329 | 10/1936 | United Kingdom | 123/272 |
| 549281 | 11/1942 | United Kingdom | 313/141 |

OTHER PUBLICATIONS

NASA Technical Briefs, Spring 1978, p. 107.

*Primary Examiner*—Andrew M. Dolinar
*Attorney, Agent, or Firm*—Christie, Parker & Hale

[57] ABSTRACT

An improved combustion igniter for internal combustion engines is disclosed, comprising a conventional spark plug improved through the addition of (a) an upwardly facing generally vertical wire element secured to the negative cathode of the spark plug and spaced apart from the positive electrode anode of the spark plug, (b) a catalyst material proximate the vertical wire element and either secured to the spark plug body or applied to the cylinder head; and (c) an injected steam source for facilitating catalytic breakdown of vapors in the combination chamber. Preferably the wire element comprises wire of pure platinum approximately 0.018" in diameter and ⅛" in length, and the catalyst is either (1) a nickel coating disposed on the cylinder head, (2) nickel wire with platinum segments disposed thereon secured to the park plug body, or (3) sheet nickel formed in a coil and disposed in the cylinder.

13 Claims, 3 Drawing Sheets

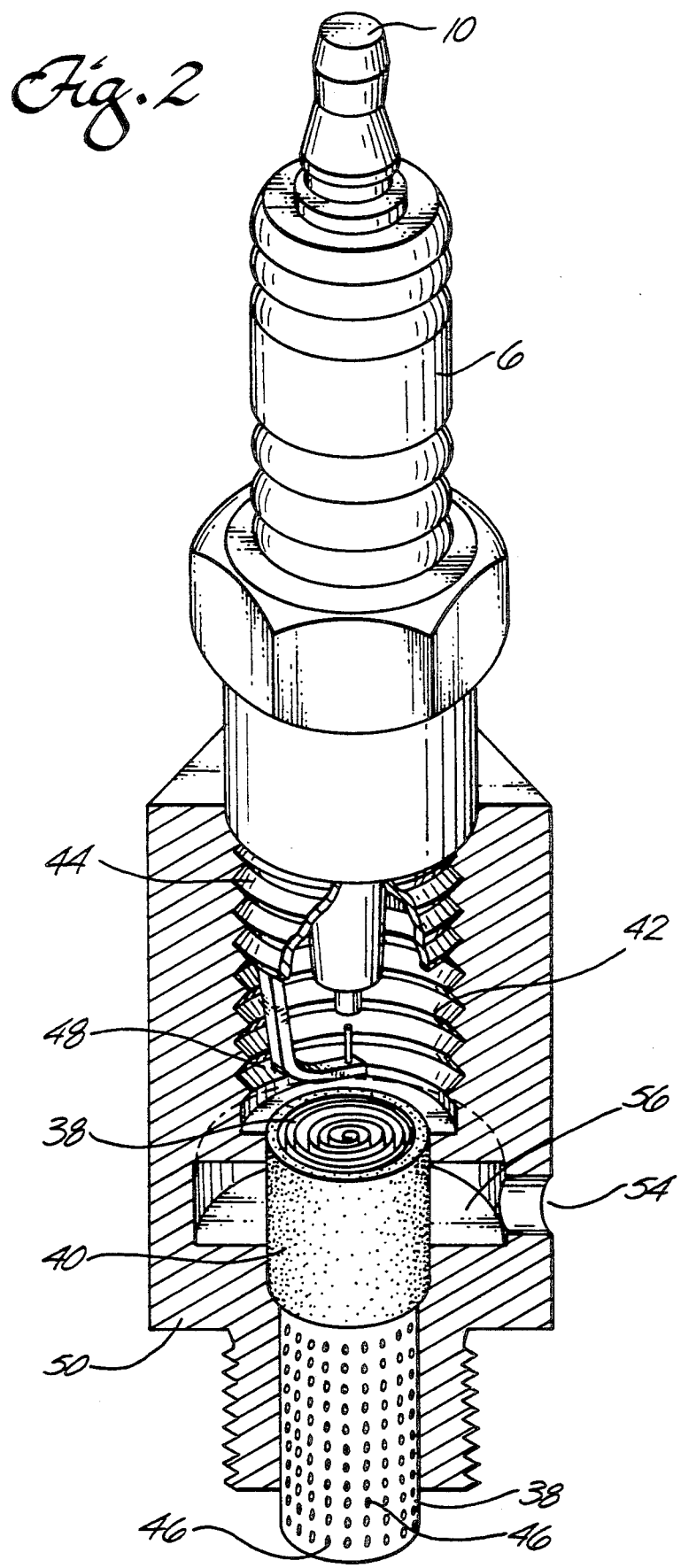

BICATALYTIC IGNITER CONVERTER AND PROCESSOR FOR INTERNAL COMBUSTION ENGINES

BACKGROUND OF THE INVENTION

1. Field of the Invention

The present invention relates generally to means for igniting the combustion chamber of a piston in an internal combustion engine. The present invention specifically relates to catalytic combustion igniters which simultaneously induce combustion and catalytic conversion of exhaust gases, using reactive metals applied both to a negative cathode of the igniter and to a surface spaced apart from the cathode, using steam injected into the combustion chamber.

The present invention embodies energy enhancement synergistically utilizing a bicatalytic igniter, converter and processor in an environment requiring water in stoichiometric ratio, resulting in energy enhancement preferably for, but not limited to, internal combustion, and specifically relates to an energy enhancement concept which simultaneously combines catalytic principles to produce a synergistic result of energy enhancement. The mechanisms involved are pyrolysis, dehydrogenation, dissociation of water and hydrocarbons, polymerization, i.e., cracking of small chain hydrocarbons, resulting in greater utilization of very lean fuel-air mixtures and/or producing additional fuel for regeneration.

The invention specifically relates to a concept which synergistically combines reprocessing of fuel, achieving energy enhancement while minimizing the environmentally harmful by-products of combustion, thus greatly reducing these levels, with obvious benefits, by treating the gases at the source without any external constraints. The end result is more miles per gallon and less dependence on foreign oil.

The concept is applicable in a vast array of present and future applications of enhanced energy devices. The distinct application to be described is one of a vast number of uses that may utilize this method of energy enhancement.

The present invention relates generally to means for the processing, converting and enhancement of the energy resulting from the ignition of available products in the combustion chamber in an internal combustion or other type of engine. The present invention specifically relates to catalytic combustion igniters which simultaneously induce synergistic process which result in energy enhancement and catalytic conversion of exhaust gases.

2. Prior Art

Conventional internal combustion engines fueled by hydrocarbon fuels, such as gasoline-powered automobile engines, usually have plural combustion cylinders each provided with a combustion ignition device such as a spark plug. The plug typically includes two spaced-apart, polarized conductive electrodes, also known as a positive anode and a negative cathode, to which a voltage is applied. The electrodes are ordinarily spaced by about 0.040 inches. When the voltage is applied, a spark jumps the gap between the electrodes in the combustion chamber and igniting combustion. The combustion efficiency and the cleanliness of exhaust products of engines using such plugs is highly dependent on the quality of spark produced by the plug. A weak spark will result in incomplete combustion in the combustion chamber, causing exhaustion of uncombusted fuel and accumulation of combustion byproducts on the plug cathodes. In contrast, a strong spark induces complete combustion and thereby reduces exhaust emissions. Another disadvantage of prior art spark plugs is that long use tends to cause wear on the electrodes, increasing the distance or "spark gap" between the electrodes. If the spark gap becomes to large, more voltage and current is required to produce a spark, and the spark also becomes weaker.

As is known in the art, electrical charge density is inversely related, for a given voltage and current, to the surface area of a conductor. Thus, given a constant voltage and current, the charge density of a small-diameter wire is far greater than that of a large-diameter wire, and therefore generates a relatively weak spark for the applied voltage. Also, the massive electrodes cool the flame front. A thin electrode effectively couples flame front and fuel air mixture. Unfortunately, most conventional spark plugs use electrodes of relatively large diameter and surface area, and therefore generate a relatively weak spark for the applied voltage.

Moreover, regardless of the ignition and combustion efficiency of prior art spark plugs, a minute quantity of uncombusted fuel is exhausted from the engine. This uncombusted fuel, combined with the products of combustion, is a major source of undesirable air pollution. Consequently, engine designers have sought means to eliminate or neutralize combustion products and uncombusted fuel after these gases leave the engine but before exhaustion into the ambient atmosphere.

One way to process exhaust gases is to use a catalytic converter interposed between the engine exhaust manifold and the tailpipe or ambient atmosphere. In a catalytic converter, as is known in the art, reactive noble metals such as platinum coat a metal filtering device placed in contact with exhaust gases as the gases are exhausted from the engine. The reactive metals catalyze exhaust products into more benign exhaust products which are discharged into the atmosphere. However, catalytic converters are quite expensive and not particularly efficient.

Prior inventors have attempted to harness the catalytic effect of platinum in various means. For example, a "Platinum Fuelsaver" device is known which injects minute quantities of platinum into the combustion chamber to induce combustion of uncombusted fuel. This method of direct injection of catalyst is also shown in Japanese Kokai No. 54-158519 (Ishiguro), which employs a catalyst chamber 3 filled with catalyst 31 proximate a spark plug. However, this method requires frequent replenishment of the platinum supply, involves considerable modification of a stock spark plug, and is not particularly efficient.

Thus, the prior art appears deficient in failing to provide a combustion igniter for internal combustion engines which overcomes the disadvantages discussed above. Therefore, motorists and those skilled in the art of internal combustion engine design would find useful an improved combustion igniter which overcomes the deficiencies of prior art igniters and spark plugs by providing superior ignition efficiency. Moreover, those skilled in the art would find desirable a combustion igniter capable of achieving partial catalytic conversion of combustion exhaust gases in the combustion chamber, using the same materials used to achieve improved spark efficiency.

Accordingly, one object of the present invention is to provide a combustion igniter for internal combustion engines which produces an efficient ignition spark having a high charge density.

A further object of the present invention is to provide a combustion igniter for internal combustion engines which suffers no degradation in spark gap size after extended periods of use.

Yet another object of the present invention is to provide a combustion igniter for internal combustion engines which accomplishes partial catalytic conversion in the combustion chamber.

Still another object of the present invention is to provide a combustion igniter for internal combustion engines which accomplishes partial catalytic conversion in the combustion chamber using catalysts bonded to a cathode of the combustion igniter.

Yet a further object of the present invention is to provide a combustion igniter for internal combustion engines which is easily manufactured at low cost.

Still a further object of the present invention is to provide a combustion igniter for internal combustion engines which is easily retrofitted to existing engines. A principal object is to synergistically combine and utilize the bicatalytic igniter, processor and converter in an environment requirement steam, in a stoichiometric ratio, resulting in energy enhancement.

SUMMARY OF THE INVENTION

These objects, and other objects which will become apparent from the detailed description of the preferred embodiments set out below, are achieved through a combustion igniter comprising a conventional spark plug improved through the addition of (a) an upwardly facing vertical noble thin wire catalyst element secured to the negative electrode of the spark plug and spaced apart from the positive electrode of the spark plug, (b) a catalyst material proximate the vertical wire element and either secured to a second wire element on the spark plug body or applied to the interior of a bushing in the cylinder head, and (c) an injected source of steam to facilitate catalytic conversion and generation of conductive plasma in the combustion chamber, thus facilitating the processing of combustible elements in the chamber.

Preferably the Wire element comprises pure platinum and the catalyst is pure nickel or pure nickel wire with platinum segments disposed thereon, but the concept is not limited to these materials. Other noble metals may be suitably used; therefore, the concept is of essence. At operating temperatures, the catalytic materials cause steam injected into the combustion chamber to disassociate into hydrogen and oxygen gases which are consumed in combustion. Functionally, the catalytic materials initiate dehydrogenation, dissociation of water, hydrocarbons, and further the polymerization of small chain hydrocarbons, thus advancing the combustion process and reducing particles that increase pollution. This synergistic reaction results in energy enhancement. The water source may be the windshield wiper fluid reservoir in a conventional automobile, or another water source proximate the engine. An auxiliary water source may be provided. Only deionized or distilled water may be used.

BRIEF DESCRIPTION OF THE DRAWINGS

FIG. 1b is a bottom plan view of the igniter of FIG. 1a;

FIG. 2 is a partial section plan view of an improved combustion igniter of a second embodiment of the present invention;

DETAILED DESCRIPTION

In the following detailed description of the preferred embodiments, certain specific descriptive terminology is used for the sake of clarity. However, the scope of the invention disclosed is not limited to the particular terms so selected, but rather encompasses all technical equivalents of the disclosed structures which function to achieve substantially the same goals in substantially the same manner.

Figure 1A:
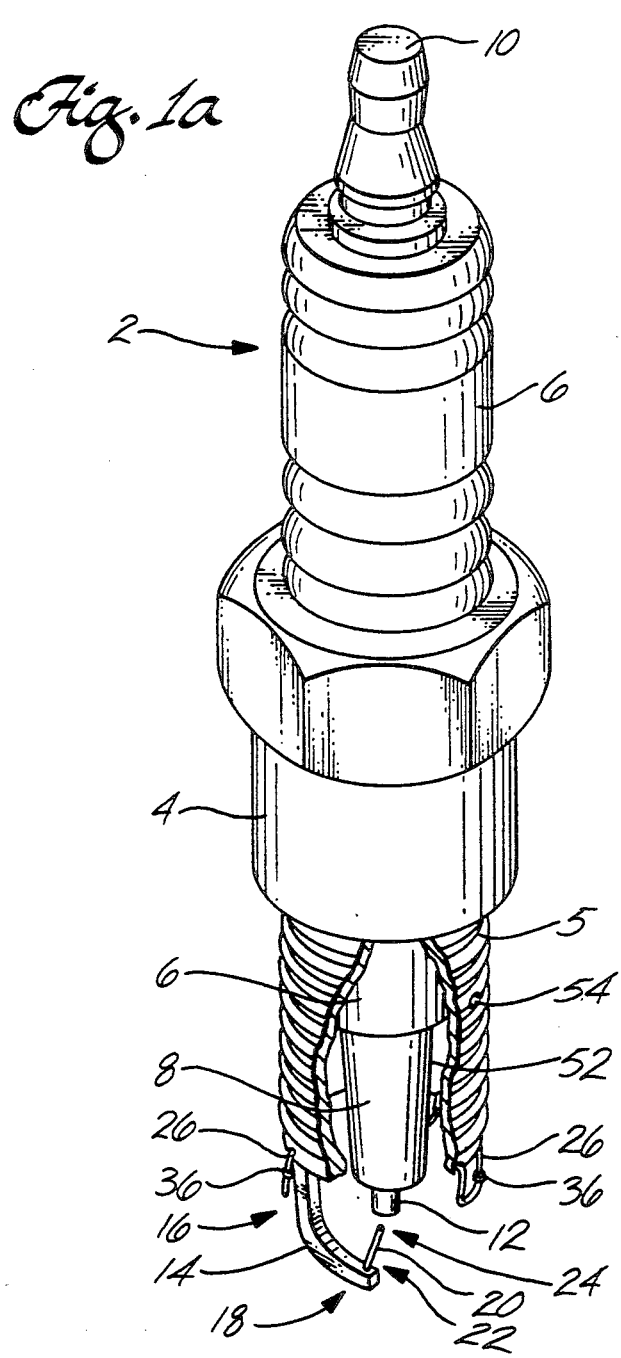
FIG. 1a is a partial section plan view of an improved combustion igniter of a first embodiment of the present invention.

Referring now to FIG. 1a, a first embodiment of the present invention is illustrated and is associated with a spark plug 2 mounted in a cylinder (not shown) of a conventional internal combustion engine (not shown). Generally conventional construction is used for spark plug 2, which includes a metal outer shell 4 in which is disposed a ceramic or porcelain insulator 6. A center electrode 8 is mounted axially in insulator 6, and electrode 8 is provided with a top terminal 10 and a bottom spark contact 12. Top terminal 10 provides a securement point, as is known in the art, for ignition voltages supplied from the engine electrical system. Electrode 8, insulator 6, and shell 4 are sealingly bonded in a manner known in the art to withstand the high temperatures and pressure created in the cylinder during the power stroke of the engine.

An inwardly protruding ground electrode arm 14 is provided having a first end 16 conductively secured to shell 4 through a threaded base 5 and a second end 18 spaced apart from and proximate contact 12. A generally vertical wire element 20 is provided having a first wire end 22 secured to end 18 of ground electrode arm 14, and a second wire end 24 spaced apart from and proximate contact 12.

Preferably wire element 20 comprises pure platinum wire, but is not restricted only to this material, approximately 0.018" in diameter and ¼" in length. As is known in the art, the output charge density of a conductive electrode is inversely related, for a given voltage and current, to the surface area of a conductor. Thus, given a constant voltage and current, the charge density of a small-diameter wire is far greater than that of a large-diameter wire. Therefore, wire of small diameter is preferred for use as wire 20. The small diameter of wire 20 prevents the so-called "hunting" effect known in the art, by confining the spark to a very small area. In fact, wire 20 functions as a point electrode, thereby assuring a very hot spark effective to initiate combustion and burn away any deposits which might otherwise collect and foul the plug.

Moreover, a small-diameter conductive wire tends to discharge ions and thereby ionize ambient gases. The effect is pronounced in small-diameter wire because of the high charge density present on a point electrode. Ionization of gases in the combustion chamber is an important aspect of the present invention, as discussed in detail below.

Figure 1B:
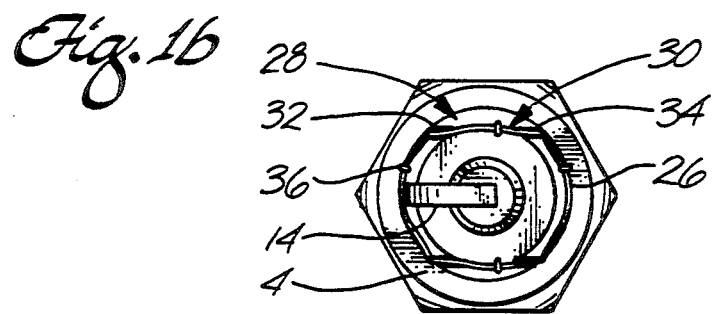

The present invention also uses a catalyst material proximate wire 20. Preferably the catalyst is pure nickel. Three embodiments or arrangements of the catalyst are contemplated. First, in the embodiment of FIGS. 1a and 1b, the catalyst comprises plural wire segments 26 of pure nickel, each segment 26 having first and second ends 28, 30 secured at spaced-apart points 32, 34 on the spark plug shell. Each segment 26 also includes a platinum wire loop or nodule 36 centrally disposed thereon.

In the second embodiment of FIG. 2, the catalyst comprises a perforated sheet 38 of nickel which is formed in a coil and disposed snugly in a cylindrical bushing 40. Bushing 40 is inserted into a hole 48 in the threaded plug mount 50 of the cylinder block. Bushing 40 includes plural threads 42 which receive threads 44 on shell 4. The bushing 40 is the active catalytic element and is made of a sintered nickel-platinum combination. Perforations 46 in sheet 38 enable injected steam to pass outwardly through sheet 38 and contact bushing 40, thereby facilitating the catalytic process.

It is also possible to use, as a catalyst, a pure nickel coating disposed on the cylinder head. This method is more expensive and difficult to retrofit than the other catalyst embodiments.

The present invention also requires a source of steam in the combustion chamber to facilitate the catalytic reaction described below. Liquid water may be introduced in the system at various points, and provided that a minute quantity of steam reaches the combustion chamber, the result will be identical regardless of the point at which the water is injected. Three arrangements of steam injection are contemplated and are illustrated in the Figures.

Figure 3A:
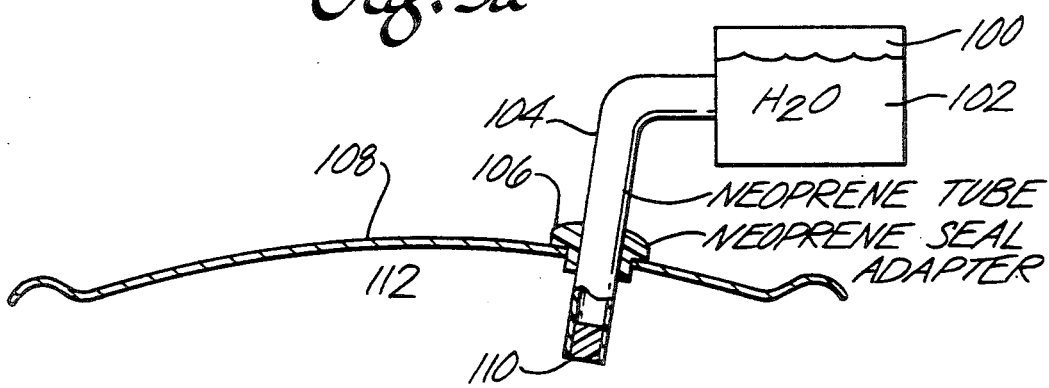
FIG. 3a is a schematic representation of elements for supplying steam to the igniter of FIG. 1a or FIG. 2.

First, as shown in FIG. 3a, water may be injected at the air filter so that an air-water mixture arrives in the combustion chamber. In such an arrangement a water line 104, which may be tubing of rubber or other suitable material, is routed from a water reservoir 100 to a seal adaptor 106 mounted on the air filter cover 108. Preferably a disc-shaped transpiration filter 110 is mounted in the coupling 106 to enable a metered amount of water 102 to pass into the air filter housing 112.

Alternatively, the water may be injected through an auxiliary port at the base of the spark plug 2. In this arrangement, a small hole 54 (FIG. 1a) is provided in the threaded base 5 of the shell 4 which permits steam to be communicated to the combustion chamber through space 52 in the plug body. A thick spacer (not shown) is then mounted over the hole to connect the combustion chamber to a water source. As shown in FIG. 2, steam injection hole 54 may also be bored in the plug mount 50 to enable injection of steam into a cavity 56 of the mount 50; the steam will thereby contact bushing 40 and sheet 38.

Figure 3B:
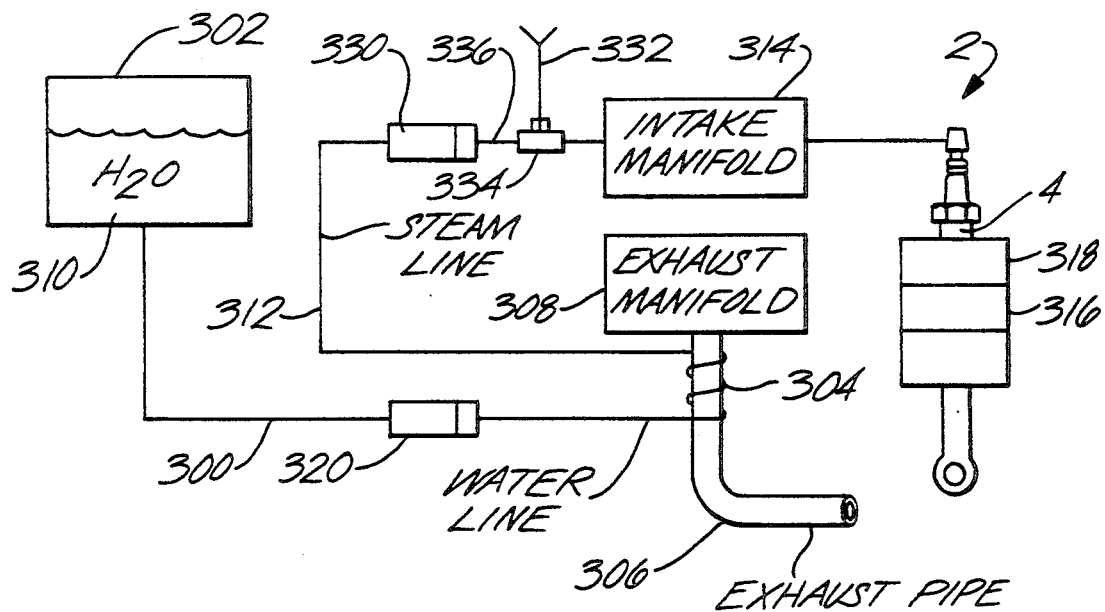
FIG. 3b is a schematic representation of the elements of the present invention and their interconnections to the internal combustion engine of a conventional automobile.

In a third arrangement, shown in FIG. 3b, the steam line 312 may be coupled directly to the automobile engine vacuum line 332; this method is preferred. To facilitate supplying a metered, minute quantity of water 310 to the combustion chamber 318, the steam line 312 is connected to the plug 2 through the vacuum line 332 and a transpiration filter 330. In one embodiment, a T-fitting 334 is installed in the engine vacuum line 332 and a branch vacuum line 336 is connected between the T fitting 334 and the steam line 312. This arrangement causes vacuum developed in the manifold 314 to draw water 310 from the water reservoir 302 through the branch vacuum line 336 when the engine is in operation, and also acts as a shut-off valve to cancel gravity flow. Transpiration filter 330 blocks all but a minute quantity of the water 310 drawn through the branch line 336.

In each of these three arrangements, heat must be applied to a water source so that steam is injected into the combustion chamber rather than liquid water, although water alone may be used, since it turns into steam directly. Heat may be obtained from the engine exhaust system or by other means known in the art. For example, as illustrated in FIG. 3, a tube 300 may be routed from a water reservoir 302 and wrapped in a coil 304 around a heat source in the form of the exhaust pipe 306 where the pipe 306 exits the exhaust manifold 308. Water 310 passing through the tube 300 is thus heated through contact with the hot exhaust pipe 306.

A critical element of each of these three steam supply arrangements is achieving the proper mix of fuel/air and steam in the combustion chamber, because an excessive amount of steam will terminate combustion while an inadequate amount of steam will not support the catalytic conversion process. Therefore, in the inventive system two transpiration filters are used to maintain stoichiometric balance in the system, as shown in FIG. 3. A transpiration filter 320 is placed in the water tube 300 between the water reservoir 302 and the heat source 306, thereby ensuring that a metered amount of water 310 is supplied to the heat source 306. Further, the transpiration filter 330 is placed in the steam line 312 between the exhaust manifold 308 and the intake manifold 314 to check the flow of steam to the combustion chamber 318 of piston 316.

As a result of the arrangement of platinum wire 20 proximate a nickel catalyst and steam in any of the above embodiments, at operating temperatures the present invention achieves production of a gaseous, conductive plasma in the combustion chamber 318 in the following manner. The presence of steam proximate platinum and nickel causes steam to disassociate, at operating temperatures, into the component materials of water, namely hydrogen and oxygen. Use of a small-diameter, highly conductive wire produces an intense spark of high charge density. Consequently, hydrogen and oxygen gases in the combustion chamber in the spark path become ionized and form a conductive plasma to effectively couple the flame front and fuel-air mixture. The large volume occupied by the conductive plasma, as compared to a conventional spark, allows about 10 times as much energy to be directed at the fuel-air mixture. This results in total combustion of the fuel-air mixture. Thus, the combination of a catalyst and a conductive, gaseous plasma results in total combustion of the fuel-air mixture and any other materials in the combustion chamber, such as carbon deposits, oil, etc.

As noted above, the nickel-platinum catalyst combination generates hydrogen and oxygen from injected water. Presence of the platinum also prevents oxidation of the nickel.

The foregoing invention is easily hand-manufactured and is also suitable for mass-manufacture. Hand manufacture is preferably accomplished by securing nickel wire to the shell of the plug and securing a platinum wire to the negative electrode, resulting in the plug structure disclosed above. The steam supply of FIG. 3 is easily constructed using ordinary tubing and by drilling a hole in the lower shell 4 of the plug 2. These steps permit rapid retrofitting of a conventional automobile as will be obvious to those skilled in the art.

Although certain specific embodiments of the present invention are disclosed above, the invention may be practiced other than as specifically described; for example, other choice of catalysts may function. For example, the nickel and platinum catalysts may be disposed elsewhere in the combustion chamber 318 or elsewhere on the spark plug shell 4 proximate the negative cathode 14. Other means for supplying steam to the combustion chamber 318 are also possible such as through direct injection of steam to the cylinders, by adapting the cylinder valves, and other methods. Therefore, the scope of the invention should not be limited to the specific embodiments described above but rather should reflect the scope of the appended claims.

What is claimed is:

1. Apparatus for igniting a combustion chamber of an internal combustion engine cylinder, comprising
   (a) a spark plug having a grounded shell, a positive electrode, a negative electrode spaced apart from the positive electrode to form a gap, and a catalytic wire element thinner than the negative electrode attached to the negative electrode extending toward the positive electrode to reduce the gap;
   (b) additional catalyst means proximate the wire element; and
   (c) metered steam injection means proximate the catalyst means to facilitate a catalytic reaction in the combustion chamber;
   wherein said wire element comprises pure platinum and wherein said catalyst means comprises plural nickel wire elements secured to said shell, each nickel wire element having a platinum wire loop secured thereon.

2. Means for igniting a combustion chamber of claim 1, wherein said steam injection means comprises:
   a hole bored in said shell proximate said wire element and perpendicular to a lengthwise axis of said plug;
   a tube having a first end connected to said hole and a second end connected to a water source, the tube being mounted proximate to a heat source between said first and second ends; and
   a transpiration wall filter, metering device and integrated shut-off valve in said tube.

3. Means for igniting a combustion chamber of claim 2, wherein said heat source comprises an exhaust pipe connected to said engine, said tube being coiled around said pipe.

4. Means for igniting a combustion chamber of claim 1, wherein said steam injection means comprises:
   a hole bored in said shell proximate said wire element and perpendicular to a lengthwise axis of said plug;
   a first tube having a first end connected to a water source and a second end connected to a vacuum source in said engine, said first tube being mounted proximate to a heat source between said first and second ends;
   a second tube having a first end connected to said second end of said first tube, and having a second end connected to said hole; and
   a transpiration filter, metering device and integrated shut-off valve in said first tube.

5. Means for igniting a combustion chamber of claim 4, wherein said heat source comprises an exhaust pipe connected to said engine, said tube being coiled around said pipe.

6. A combustion igniter for a piston combustion chamber of an internal combustion engine, the igniter comprising:
   an igniter body having a positive electrode and a negative cathode;
   a platinum wire element thinner than the negative cathode secured to said negative cathode extending toward said positive electrode axially of said igniter body;
   catalytic material substantially comprising pure nickel disposed in said piston chamber proximate to and spaced apart from said wire element; and
   means for injecting steam into said igniter body proximate said wire element and said catalytic material;
   wherein said catalyst material comprises plural nickel wire elements secured to said body, each nickel wire element having a platinum wire loop secured thereon.

7. A combustion igniter for a piston combustion chamber of an internal combustion engine, the igniter comprising:
   an igniter body having a positive electrode and a negative cathode;
   a platinum wire element thinner than the negative cathode secured to said negative cathode extending toward said positive electrode axially of said igniter body;
   catalytic material substantially comprising pure nickel disposed in said piston chamber proximate to and spaced apart from said wire element; and
   means for injecting steam into said igniter body proximate said wire element and said catalytic material;
   wherein said catalytic material comprises plural nickel wire elements secured to said body, each nickel wire element having a platinum wire loop secured thereon;
   wherein said steam injection means comprises:
   a hole bored in said body proximate said wire element and perpendicular to a lengthwise axis of said body;
   a tube having a first end connected to said hole and a second end connected to a water source, the tube being mounted proximate to a heat source between said first and second ends; and
   a transpiration filter in said tube.

8. A combustion igniter for a piston combustion chamber of an internal combustion engine, the igniter comprising:
   an igniter body having a positive electrode and a negative cathode;
   a platinum wire element thinner than the negative cathode secured to said negative cathode extending toward said positive electrode axially of said igniter body;
   catalytic material substantially comprising pure nickel disposed in said piston chamber proximate to said spaced apart from said wire element; and
   means for injecting steam into said igniter body proximate said wire element and said catalytic material;
   wherein said catalytic material comprises plural nickel wire elements secured to said body, each nickel wire element having a platinum wire loop secured thereon;
   wherein said steam injection means comprises:

a hole bored in said body proximate said wire element and perpendicular to a lengthwise axis of said body;

a tube having a first end connected to said hole and a second end connected to a water source, the tube being mounted proximate to a heat source between said first and second ends; and a transpiration filter in said tube wherein said heat source comprises an exhaust pipe connected to said engine, said tube being coiled around said pipe.

9. A combustion igniter for a piston combustion chamber of an internal combustion engine, the igniter comprising:

an igniter body having a positive electrode and a negative cathode;

a platinum wire element thinner than the negative cathode secured to said negative cathode extending toward said positive electrode axially of said igniter body;

catalytic material substantially comprising pure nickel disposed in said piston chamber proximate to and spaced apart from said wire element; and means for injecting steam into said igniter body proximate said wire element and said catalytic material;

wherein said catalytic material comprises plural nickel wire elements secured to said body, each nickel wire element having a platinum wire loop secured thereon;

wherein said steam injection means comprises:

a hole bored in said body proximate said wire element and perpendicular to a lengthwise axis of said plug;

a first tube having a first end connected to a water source and a second end connected to a vacuum source in said engine, said first tube being mounted proximate to a heat source between said first and second ends;

a second tube having a first end connected to said second end of said first tube, and having a second end connected to said hole; and a transpiration filter in said first tube.

10. A combustion igniter for a piston combustion chamber of an internal combustion engine, the igniter comprising:

an igniter body having a positive electrode and a negative cathode;

a platinum wire element thinner than the negative cathode secured to said negative cathode extending toward said positive electrode axially of said igniter body;

catalytic material substantially comprising pure nickel disposed in said piston chamber proximate to said spaced apart from said wire element; and means for injecting steam into said igniter body proximate said wire element and said catalytic material;

wherein said catalytic material comprises plural nickel wire elements secured to said body, each nickel wire element having a platinum wire loop secured thereon wherein said steam injection means comprises:

a hole bored in said body proximate said wire element and perpendicular to a lengthwise axis of said plug;

a first tube having a first end connected to a water source and a second end connected to a vacuum source in said engine, said first tube being mounted proximate to a heat source between said first and second ends;

a second tube having a first end connected to said second end of said first tube, and having a second end connected to said hole; and a transpiration filter in said first tube;

wherein said heat source comprises an exhaust pipe connected to said engine, said tube being coiled around said pipe.

11. A combustion igniter for internal combustion engines, the igniter comprising a conventional spark plug having a grounded body, a negative electrode and a positive electrode, further including:

(a) a generally vertical wire element secured to the negative electrode extending toward the positive electrode, and spaced apart from the positive electrode of the spark plug;

(b) plural nickel catalyst wires proximate the vertical wire element and secured to the spark plug body, each catalyst wire having a platinum wire loop secured thereon; and (c) a steam injection source including a steam line mounted on said body.

12. The igniter of claim 11, wherein the vertical wire element comprises platinum wire approximately 0.018" in diameter and $\frac{1}{8}$| in length.

13. The igniter of claim 11, further including a transpiration wall metering device that supplies water, wherein the device is metered to achieve stoichiometric proportions and automatically shuts off when not required.

* * * * *